United States Patent [19]

Bondor

[11] 4,039,307

[45] Aug. 2, 1977

[54] COUNTERCURRENT FLOW HORIZONTAL SPRAY ABSORBER

[75] Inventor: Frank Samuel Bondor, New Canaan, Conn.

[73] Assignee: Envirotech Corporation, Menlo Park, Calif.

[21] Appl. No.: 657,736

[22] Filed: Feb. 13, 1976

[51] Int. Cl.² .............................................. B01D 47/00
[52] U.S. Cl. .................... 55/228; 55/257 R; 261/21; 261/125; 261/17; 261/117
[58] Field of Search ............. 55/73, 223, 256, 259, 55/228, 257 R; 261/115-118, 17, 125, 21, 22

[56] References Cited

U.S. PATENT DOCUMENTS

| | | | |
|---|---|---|---|
| 973,120 | 10/1910 | Lloyd | 261/117 |
| 1,010,068 | 11/1911 | Pavella | 261/115 |
| 1,060,269 | 4/1913 | Leinert | 55/228 |
| 1,677,409 | 7/1928 | Rottmann et al. | 261/116 |
| 3,284,435 | 11/1966 | McIlroy et al. | 55/228 |
| 3,815,334 | 6/1974 | Kotting et al. | 55/90 |
| 3,907,523 | 9/1975 | Melin, Jr. | 55/73 |
| 3,907,526 | 9/1975 | Saleem et al. | 55/223 |
| 3,948,608 | 4/1976 | Weir, Jr. | 23/284 |

Primary Examiner—Bernard Nozick

Attorney, Agent, or Firm—Hal J. Bohner; Robert E. Krebs

[57] ABSTRACT

Gas-liquid contacting efficiency is enhanced in a horizontal scrubbing vessel having first and second baffle means forming a series of side-by-side compartments across the vessel and arranged so that gas flows from the upper-most portion of each compartment and is directed downward so as to enter the next downstream compartment at the bottom-most portion thereof for upward flow therein. Scrubbing liquid is sprayed downward into each compartment for countercurrent gas-liquid contact herein. The liquid collected at the bottom of each compartment is passed to the top of the next upstream compartment for full countercurrent flow through and across the vessel, with the scrubbing liquid being reactivated and recycled to the furthermost downstream compartment. When a common liquid collection means is provided for all compartments, the reactivated liquid can be recycled to the spraying means of each compartment in parallel so that the gas contacts freshly reactivated liquid in each compartment. A mist eliminator is provided for removal of entrained liquid from the treated gas leaving the vessel and can be provided at the gas exit from each compartment to minimize liquid entrainment and further enhance gas-liquid contacting efficiency.

16 Claims, 3 Drawing Figures

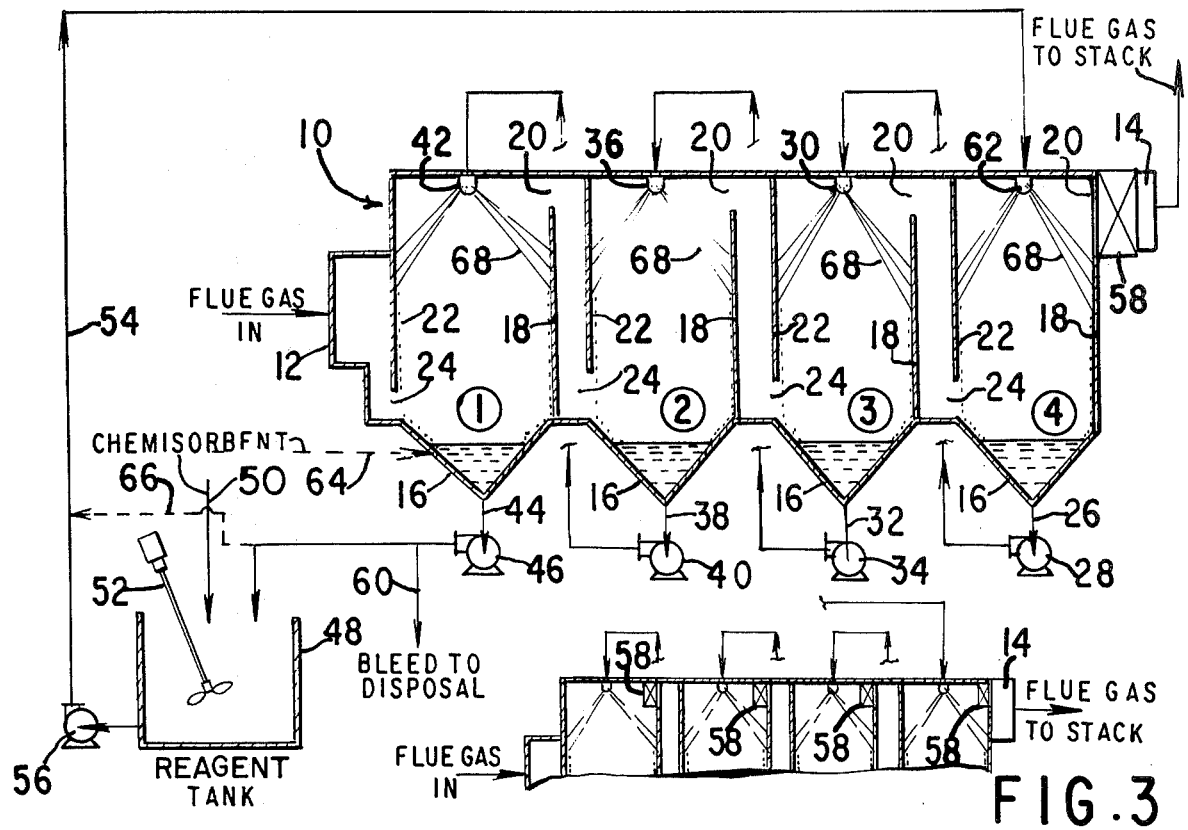
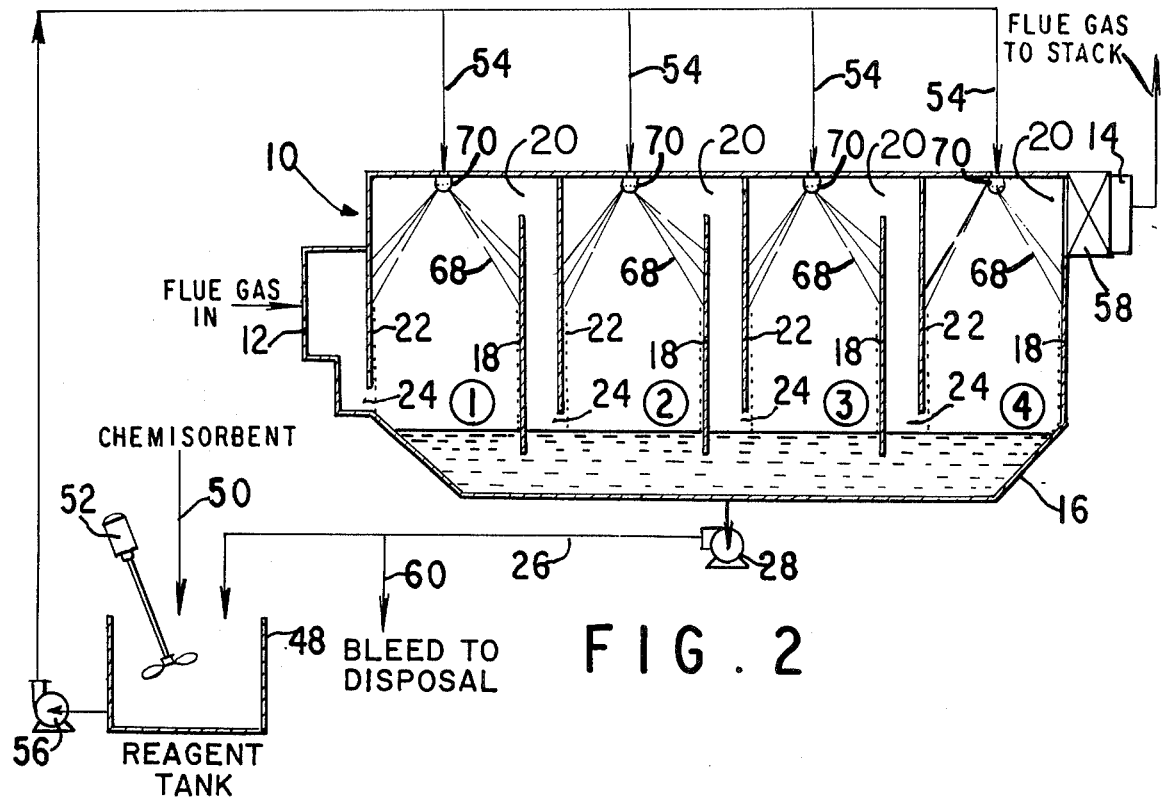

COUNTERCURRENT FLOW HORIZONTAL SPRAY ABSORBER

BACKGROUND OF THE INVENTION

1. Field of the Invention

This invention relates to gas-liquid scrubbing apparatus. More particularly, it relates to an improved horizontal scrubbing apparatus having enhanced countercurrent gas-liquid contacting efficiency throughout the apparatus.

2. Description of the Prior Art

The growing awareness of the environmental hazards inherent in industrial and other commercial activities has resulted in ever more restrictive air pollution control regulations and concerns. Such concerns relate not only to air, water, and ground subjected to exposure to a variety of contaminants, but to the overall economic impact of measures available to satisfy environmental standards as reflected by pollution control laws and governmental regulations at all levels. In many instances, troublesome choices are confronted between the long range adverse environmental impact of industrial or other commercial operations and the adverse effect on the economic feasibility of the operations themselves resulting from efforts to provide effective and otherwise desirable pollution control measures. Accordingly, it is highly desirable and even vital that continued efforts be made to develop pollution control measures achieving a combination of more effective and efficient operation together with reduced cost for a particular operation.

For the treatment of industrial waste gases to be released to the atmosphere, the use of horizontal scrubbers has been known in the art as providing a desirable combination of efficiency and economy. Thus, Chemical Engineering, Nov. 21, 1966, p. 88 describes a horizontal scrubber which causes the gas stream to follow a tortuous path, resulting in higher contacting efficiency and increased gas treating capacity per unit size. Among other advantages cited are a reduction in structural support requirements, reduced duct work requirements and adaptability to limited overhead or floor space restrictions.

The Lloyd patent, U.S. Pat. No. 973,120, issued Oct. 18, 1910 illustrates that recent interest in the advantage of horizontal scrubbing devices is a reflection of very old technology updated in light of existing applications and environmental considerations. Lloyd discloses a horizontal scrubber in which gas flow is upward in each compartment containing scrubbing trays 8, with scrubbing liquid being discharged from spray nozzles 19 in each compartment for generally downward passage therein. Baffles 2 direct gas from each compartment downwardly for entrance into the next compartment at the bottom thereof. Liquid is collected in collection basins at the bottom of each compartment, with liquid overflowing from one basin to another countercurrent to the flow of gas through the unit. Liquid is pumped to the top of each compartment from the collection basin at the bottom thereof. As liquid is carried over with the gas exiting from each compartment, Lloyd achieves a further spraying action by positioning inclined plane 25 near the bottom of each baffle 2 causing the liquid to impinge thereon and form an additional spray through which the gas passes on its way to the next compartment. Scrubbing trays 8 are provided in each compartment. The Lloyd scrubber thus provides for a sinuous up and down course for the gas on its generally horizontal passage through the scrubber from one end to the other. The scrubbing liquid also passes eventually horizontally by overflow in the bottom of each compartment through the scrubber countercurrent to the direction of gas flow and passes downwardly in each compartment. With the scrubbing liquid continually being drawn from the bottom of each compartment and delivered to the top of the same compartment (p. 2, lines 13-21), however, full countercurrent flow of gas and liquid throughout the scrubber is not achieved. Similarly, the scrubber of the Chemical Engineering article referred to above does not achieve full countercurrent flow as the gas flow and liquid flow are both downward in the middle compartment of the device shown.

Rottmann et al, U.S. Pat. No. 1,677,409, discloses a plant for the absorption of gases and vapors, particularly of nitrous gases in the production of nitric acid, in which a series of concentric absorption towers packed with filling-rings or other acid-proof solid packing material is provided. The gaseous medium to be absorbed passes upwardly in the central tower and then successively upward through each of the annular towers around said central tower. Absorbing liquid is sprayed downwardly into each of said packed absorption towers, with separate discharge pipes being provided at the bottom of each packed tower. All of the packed concentric towers are arranged within superstructure c, so that leakage from any of the towers is contained within the plant. Countercurrent gas-liquid contact in each absorption tower is achieved with liquid from each tower passing separately to a point of utilization. The overall absorption plane with its necessary substructure may tend to obviate the advantage of reduced structural cost noted for present-day horizontal scrubbers as noted in the above-mentioned Chemical Engineering article. In addition, the earlier plant design, being relatively susceptible to plugging in operation and being difficult to clean because of the limited access available to internal parts of the plant, may tend to be impractical from a maintenance viewpoint in light of the current pollution control standards and the interrelated economic factors referred to above.

In a paper presented at the United States EPA "Flue Gas Desulfurization Symposium," Nov. 4, 1974, entitled "THE HORIZONTAL CROSS FLOW SCRUBBER", a horizontal scrubber is shown in which spray nozzles are positioned in a series of overhead rows for the downward spraying of scrubbing liquid on a flow of gas passing horizontally through the scrubber. While cross flow of gas and liquid is provided in this arrangement, full countercurrent flow is, of course, not achieved by such an arrangement.

There remains, on a continuing basis, a need for the development of pollution control systems in general, and gas scrubbing systems in particular, tailored to the specific needs of given applications. Such specific needs, of course, include ever increasing operation efficiency and reduced overall costs. By such development, the urgent requirements of environmental factors can be rendered more consistent with the equally compelling requirements of achieving pollution control within the framework of an economically feasible commercial operation.

It is an object of the present invention to provide an improved horizontal gas scrubbing apparatus.

It is another object of the invention to provide a horizontal scrubber having enhanced gas-liquid contacting efficiency.

It is a further object of the invention to provide a horizontal scrubber in which countercurrent gas-liquid contact is optimized.

It is a further object of the invention to provide a horizontal scrubber combining enhanced contacting efficiency with desirable compactness and structural economy.

With these and other objects in mind, the invention is hereinafter described with respect to various embodiments thereof, the novel features of which are set forth in the appended claims.

SUMMARY OF THE INVENTION

The present invention enhances the efficiency of gas-liquid contact by achieving countercurrent contact throughout the novel horizontal scrubber apparatus. The gas being treated passes through the scrubber in a generally horizontal manner, while passing upward in each compartmentalized section thereof. Scrubbing liquid is sprayed downward in each such section, with the liquid collected at the bottom of each section advantageously delivered to the top of the next preceding section so that full countercurrent flow is achieved horizontally across the overall scrubber and vertically in each compartmentalized section thereof. In another arrangement, countercurrent contact of the gas in each section is with fresh or freshly reactivated scrubbing liquid for desirable gas scrubbing by such means. The provision of a mist eliminator at the gas exit of the scrubber obviates undesired liquid entrainment in the treated gas stream, with mist eliminators at the gas exit of each compartmentalized section minimizing such liquid carryover from one section to the next. Such provisions, together with the positioning of liquid spray nozzles so that the uppermost portion of the liquid spray strikes the baffles forming the compartmentalized sections below the gas exit from that section, minimizes liquid carryover, enhances gas-liquid contacting efficiency, and optimizes full gas-liquid countercurrent contact within the horizontal scrubber.

BRIEF DESCRIPTION OF THE DRAWINGS

The invention is hereinafter described with reference to the accompanying drawings in which:

FIG. 1 is a diagrammatic view of the horizontal scrubber system of the present invention for achieving full countercurrent gas-liquid contact within and across the scrubber.

FIG. 2 is a diagrammatic view of an alternate arrangement of the invention in which the gas being treated is passed in countercurrent contact with fresh scrubbing liquid in each compartmentalized section of the horizontal scrubber.

FIG. 3 is a partial diagrammatic view of the embodiment of FIG. 1, illustrating an alternative mist eliminator arrangement in the scrubbing system of the invention.

DETAILED DESCRIPTION OF THE INVENTION

Among the various so-called wet processes for chemisorption of undesirable gaseous pollutants from industrial waste gases released to the atmosphere are venturi scrubbers, packed towers including those with a fixed bed or with mobile packing, tray towers, vertical spray towers and horizontal spray scrubbers. The present invention relates to horizontal spray scrubbers and is adapted to achieve true countercurrent flow of the gas being treated with the scrubbing liquid employed. Thus, the invention enhances the effectiveness and efficiency of horizontal spray scrubbers, which are important pollution control systems offering particular advantages over other available systems for specific gas treating applications.

The true countercurrent spray tower of the present invention incorporates gas scrubbing liquid contact zones positioned side-by-side within the horizontally extending scrubber housing. This arrangement has several advantages over the vertially stacked contact zone arrangement of conventional spray towers including: (a) reduced pressure head requirements for pumping recycle liquid to all of the contact zones downstream of the initial gas-liquid contact zone; (b) reduced capital cost due to lesser weight requirements for foundations, shorter piping runs and shorter duct work runs; (c) increased liquid droplet quantity and greater droplet surface area, resulting in enhanced contacting efficiency, due to the absence of liquid droplets from upstream contacting zones combining with droplets from downstream zones as occurs in conventional vertical spray towers; and (d) the absence of the coalescence of spray droplets on the walls of adjacent gas contacting zones as occurs with respect to droplets from upper zones in vertical spray towers, thus also enhancing gas-liquid contacting efficiency with more surface area of droplets available for contact with the gas being treated.

As compared to the conventional horizontal cross-flow spray absorbers of the art, the truly countercurrent gas-liquid flow of the present invention results in enhanced contacting efficiency over devices providing gas cross-flow with respect to the scrubbing liquid. In addition, the horizontal spray tower system of the present invention eliminates or minimizes the entrainment of liquid droplets carried by the treated gas from zone to succeeding zone. Such entrainment is common in conventional horizontal spray towers. The elimination of such liquid entrainment further contributes to the contacting efficiency of the scrubbing operation.

In FIG. 1 of the drawings, an embodiment is illustrated in which vertical countercurrent gas-liquid contact is achieved in each of four contact zones with all of the gas being treated passing through the overall horizontal scrubbing system in a generally horizontal manner counter-currently with the generally horizontal flow of scrubbing liquid across the horizontal scrubber system. Thus, horizontal spray scrubber 10 is provided with gas entrance 12 at one end thereof and with gas exit 14 at the opposite end. Scrubber 10 is divided into four gas-liquid contacting zones, i.e. zones No. 1, 2, 3 and 4, each of which has a liquid collection basin 16 at the bottom thereof. A series of first vertically extending baffles 18 extend upward from the liquid basin region at the bottom of scrubber 10 to form said four contacting zones. In FIG. 1, each of said first baffles 18 extend to the uppermost portion of the spray scrubber 10, but terminate short of the top thereof, thus resulting in a series of exit openings 20 at the uppermost portion of zones No. 1, 2, 3 and 4, respectively.

A series of second vertically extending baffles 22 extend downward from the top of scrubber 10 to the bottom-most portion of each contacting zone or compartment. Said baffles 22 terminate short of the bottom of scrubber 10, thus resulting in a series of gas entrance openings 24 at the bottom-most portion of said zones 1-4. Baffles 22 are positioned at the upstream, from a gas flow viewpoint, side of each contacting zone, for co-action with the first series of baffles 18 to create a downward passage fo gas entering zone No. 1 from gas entrance 12 and entering downstream zones No. 2, 3 and 4 from gas entrance 24, so that said gas passes into the body of said zones No. 1-4 at the bottom-most portion of each.

Reactivated scrubbing liquid is pumped through line 54 by means of pump 56 for delivery to spray nozzle(s) 62 positioned in zone 4 at the top thereof. Liquid withdrawn from collection basin 16 of zone No. 4 through line 26 is pumped by pump 28 to spray nozzle(s) 30 positioned at the top of zone 3. Similarly, liquid withdrawn from basin 16 of zone 3 through line 32 is pumped by pump 34 to spray nozzle(s) 36 positioned in zone 2 at the top thereof. In like manner, liquid withdrawn from basin 16 of zone 2 through line 38 is pumped by pump 40 to the top of zone 1 for spraying therein through spray nozzle(s) 42. Liquid withdrawn from liquid collection basin 16 of zone 1 through line 44 is pumped by pump 46 to reagent tank 48, bleed line 60 being provided for withdrawal of a portion of said liquid to disposal or regeneration. Chemisorbent is introduced into said tank 48 through line 50, with appropriate agitation means 52 provided for assuring proper mixing in reagent tank 48.

In operation of the spray scrubbing system of the invention, the gas to be treated enters scrubber 10 at entrance 12, is passed downward by baffle 22 and enters zone No. 1 through opening 24 at the bottom-most portion of said zone for upward passage therein. The gas leaves said zone No. 1 through opening 20 at the upper-most portion of said zone and is caused to pass downward in the downwardly extending passage formed by the co-action of baffles 18 and 22. The gas thus enters zone No. 2 through opening 24 at the bottom-most portion of said zone. Likewise, the gas passes upward in zone No. 2, downward in the downwardly passage formed by baffles 18 and 22, upward in zone No. 3, downward in the passage formed by said baffles, and upward in zone No. 4. Gas exiting from zone No. 4 from the upper-most portion thereof through opening 20 passes through mist eliminator 58 to remove entrained liquid from the treated gas being withdrawn from scrubber 10 through gas exit 14. The gas passes upward in each contacting zone, therefore, while passing generally horizontally across the length of scrubber 10 from one contacting zone or compartment to the next downstream zone or compartment.

Scrubbing liquid on the other hand, is pumped from reagent tank 48 to scrubber 10 through line 54 and is sprayed downwardly through nozzle(s) 62 from the top of zone No. 4, collecting in basin 16 of said zone 4. All of said liquid is passed to spray nozzle(s) 30 of zone No. 3 and is sprayed downwardly in said zone 3, collecting in basin 16 at the bottom thereof. Likewise, all of the liquid from said basin 16 is sprayed into zone No. 2 through spray nozzle(s) 36, collecting in basin 16 at the bottom of said zone 2 and being pumped therefrom to spray nozzle(s) 42 at the top of zone No. 1. The liquid collected in basin 16 of zone 1 is pumped to reagent tank 48 for mixing with make-up chemisorbent prior to recycle through line 54 for spraying once again in zone No. 4 through spray nozzle(s) 62. Bleed line 60 is provided for bleeding spent scrubbing liquid to disposal. The scrubbing liquid passes downward in each contacting zone, therefore, while passing generally horizontally across the length of scrubber 10 from one contacting zone or compartment to the next upstream zone or compartment.

Make-up chemisorbent can, in another embodiment, be added to spent scrubbing liquid in basin 16 of zone No. 1, as through line 64. In this alternative, reactivated liquid is pumped through line 44 and line 66 by pump 46 directly to line 54 for recycle to zone No. 4. Appropriate means, not shown, can be provided in said basin 16 to achieve a proper degree of mixing of make-up chemisorbent and spent scrubbing liquid.

As will readily be appreciated, the present invention achieves vertical countercurrent contact of gas and liquid in each contacting zone and generally horizontal countercurrent gas-liquid contact as all of the gas being treated and all of the scrubbing liquid pass across the length of the scrubber in opposite directions from one scrubbing zone to the next. True countercurrent contacting of the gas with the scrubbing liquid is thus achieved, enhancing the effectiveness and efficiency of the overall gas spray scrubbing operation.

FIG. 2 illustrates another embodiment of the invention in which the co-action of said first and second sets of vertically extending baffles, i.e. baffles 18 and 22, is as exists in the embodiment of FIG. 1. Thus, said baffles compartmentalize the interior of scrubber 10 in four zones, namely zones No. 1, 2, 3 and 4 in each of which gas entering the zone at entrance opening 24 at the bottom-most portion thereof passes upward to gas discharge opening 20 at the upper-most portion of each said zone prior to discharge through conventional mist eliminator 58 and scrubber exit 14. Likewise, liquid is sprayed downwardly in each said zone from spray nozzle(s) 70 for countercurrent contact with the upwardly flowing gas stream in said zones. Instead of separate, individual collection basins at the bottom of each zone, however, the embodiment of FIG. 2 incorporates a common collection basin 16 serving all four zones within scrubber 10. Scrubbing liquid from basin 16 is pumped through line 26 by pump 28 to reagent tank 48 for mixing therein with fresh chemisorbent from line 50. Agitation means 52 are shown for assuring adequate mixing within tank 48. Reactivated scrubbing liquid passes from tank 48 for delivery to spray means 70 in paralell, so that the gas stream passing upward in each compartment is in vertical countercurrent contact with the freshly reactivated, downwardly sprayed scrubbing liquid in each contacting zone. This embodiment achieves vertical countercurrent contact of gas and liquid in each contacting zone and generally horizontal cross-flow gas-liquid contact across the length of the scrubber from one contacting zone to the next, thus providing a high overall efficiency of the desired gas-liquid contact within the vessel.

FIG. 3 illustrates an alternative embodiment of the invention as illustrated in FIG. 1, with a separate conventional mist eliminator 58 positioned at the gas flow passage 20 of each contact zone of said FIG. 1. In this manner, the interzonal entrainment of liquid in the gas being treated is minimized, thus further enhancing the efficiency of the countercurrent gas-liquid contact throughout the vessel. The mist eliminator at the gas exit of zone No. 4 serves to remove entrained liquid from the treated gas withdrawn from vessel 10 through exit 14.

The undesired entrainment of scrubbing liquid from one contacting zone in the gas stream leaving that zone is further minimized by the positioning of the spray means in each zone or compartment so that the cone of sprayed liquid emitted therefrom in a generally downward direction will intercept baffle means 18 at a point below the passage for the flow of gas from the uppermost portion of that zone. In FIG. 1, this positioning of spray mean 42, 36, 30 and 62 is shown by spray cone 68 in each zone, said cone 68 striking baffle means 18 below gas passage 20 of each zone, which is formed by the gap between the top of vessel 10 and the upper end of baffle means 18. Back flow of scrubbing liquid through said gas passage 20 is thereby minimized, further enhancing the overall efficiency of countercurrent gas-liquid contact throughout vessel 10. Similar positioning of the spray means is shown in FIGS. 2 and 3.

In the practice of the invention, any desired number of contacting zones or compartments can be provided for a given gas scrubbing application. While a two-compartment scrubber can be provided, the number of compartments employed will more commonly be on the order of from 3 to about 10, with a four compartment scrubber, as illustrated, being suitable for many applications. It will be appreciated that considerably more than 10 compartments may also be provided if desired, with gas-liquid contact being as herein described within each compartment.

It will be appreciated that the baffle means employed to compartmentalize the scrubber system of the present invention can incorporate a variety of structural arrangements so long as the desired gas and liquid flow patterns are maintained. For example, FIG. 1 shows baffle means 18 extending upward from the bottom of each zone to a point near the top of the scrubber, with opening 20 comprising a gap between the top of the vessel and the upper end of baffle means 18. It would also be within the scope of the invention to have baffle means 18 extend to the top of scrubber 10 and to have said baffle means 18 with an opening or perforations therein for the passage of gas at the upper-most portion of the compartments. FIG. 2, illustrating a common collection basin, shows baffle means 18 extending downward into the scrubbing liquid in collection basin 16 so as to prevent gas flow from one zone to the next at that portion of the scrubber, but not reaching the bottom of scrubber 10, supporting structure not forming an essential part of the invention obviously being employed to support said baffle means 18 as shown. It would also be within the scope of the invention to have said baffle means 18 extend downward and connect to the bottom of collection basin 16 with an opening or perforations formed in the bottom portion of said baffle means 18 to permit the flow of liquid to the common discharge point from various portions of the collection basin.

Likewise, baffle means 22 extends from the top of scrubber 10 to the bottom-most portion of the scrubber, with opening 24 comprising the gap between the bottom of baffle means 22 and the top of basin 16 in FIG. 1 and the gap between the bottom of baffle means 22 and the liquid level in common basin 16 in FIG. 2. It would also be within the scope of the invention to have baffle means 22 extend to the bottom of scrubber 10 with appropriate openings or perforations provided for the passage of gas into each downstream zone or compartment at the bottom-most portion thereof after said gas has passed downwardly in the downwardly extending passage formed by the co-action of said second vertically extending baffle means 22 with said first vertically extending baffle means 18. While the spacing between the first and second baffle means is not critical, it will be appreciated that said co-action between the two baffle means in each compartment is to provide the downwardly extending passage for the gas entering the upper portion of each downstream compartment, said second baffle means 22 being adapted to permit the flow of gas downward from the upper portion of said passage to exit from said passage into the body of each said downstream compartment at the bottom-most portion thereof, so that gas passing across the length of said horizontally-extending vessel 10 will pass into each compartment at the bottom thereof and pass out of each said compartment at the top, thus providing for an upward flow of gas through each compartment as said gas passes through vessel 10.

Those skilled in the art will appreciate that the apparatus of the present invention can be used for a wide variety of wet process gas absorption operations. Illustrative thereof are the removal of undesired pollutants such as $SO_2$, $NO_x$, $H_2S$ and the like, or combinations thereof, from industrial waste gas streams. The scrubbing liquid employed can be selected from any of the known chemisorbents commonly employed in such gas scrubbing operations. The chemisorbent will ordinarily be dissolved in water or employed as a slurry in water, although the particular chemisorbent system employed is not a critical aspect of this invention. Illustrative of the known chemisorbent systems useful in the practice of the invention are lime or limestone slurries in water, magnesium oxide slurries in water, sodium and ammonium salt solutions in water, other alkali salts in water, and various combinations of such chemisorbents in water or other liquids.

It will also be appreciated that the gas flow and liquid flow rates employed in the practice of the invention are not limited to any specific amounts, but can be varied as necessary or desirable in any particular gas absorption application depending on the specific pollutants or gaseous components to be removed, the degree of removal desired and the specific chemisorbent and concentration thereof employed. Those skilled in the art will further recognize that the bleed stream of spent scrubbing liquid withdrawn from the system through line 60 will ordinarily be disposed of as by-product of the gas treatment operation or regenerated for recycle as make-up chemisorbent depending on the relative economies of the chemisorbent employed and of the regeneration techniques available in the art.

The invention has been described and illustrated with respect to embodiments having no packing or contact trays in the individual contact zones or compartments. It should be noted that the provision of such packing or contact trays in said zones is within the scope of the invention although for many common applications, the absence of column packing or trays is generally preferred. It will be appreciated that contacting efficiency is improved by such packing, but that the provision of such packing results in a higher differential pressure drop across the scrubber with consequent higher operating and capital costs. The formation of solid by-products, such as $CaSO_4$ in lime scrubbing operations, also may have a tendency to cause plugging within the scrubber compartments. If this should occur, the absence of column packing or trays is highly important and may even be differential from an operating viewpoint. It should be noted that the apparatus of the invention can also be used for removal of particulate material, as well as gaseous pollutants such as those indicated above, from the gas stream being treated. In other embodiments of the invention, however, it is contemplated that the particulate material will be removed from the gas stream being treated in advance of its passage into the scrubber herein disclosed and claimed.

The present invention represents a highly desirable advance in the art, furthering the inherent advantages of horizontal scrubbers by enhancing the effectiveness and efficiency of gas-liquid contact while maintaining operating and capital cost advantages as described herein. As the environmental imperatives affecting industrial processing operations are necessarily interdependent with the technical and economic aspects of available pollution control apparatus and techniques, the present invention affords an important advance in the field of gas scrubbing and of pollution control.

Therefore, I claim:

1. A horizontal gas scrubbing apparatus in which enhanced gas-liquid contacting efficiency is achieved comprising:
   a. a horizontally extending gas-liquid contacting vessel;
   b. means for passing gas to be treated into the vessel at one end thereof;
   c. means for withdrawing terated gas from said vessel at the opposite end thereof;
   d. first vertically extending baffle means positioned at spaced-apart intervals within said vessel, so as to form a series of compartments positioned side-by-side across the length of said vessel, said first baffle means adapted, together with said vessel, to permit the flow of gas upward in each compartment, and from the uppermost portion of each compartment into the next downstream compartment within said vessel;
   e. second vertically extending baffle means positioned at spaced-apart intervals within said vessel for coaction with said first baffle means to form a downwardly extending passage for the gas entering the upper portion of each said downstream compartment, said second baffle means being adapted to permit the flow of gas downward from the upper portion of said passage to exit from said passage into the body of each said downstream compartments at the bottommost portion thereof, so that gas passing across the length of said horizontally-extending vessel will pass into each compartment at the bottom thereof and pass out of each said compartment at the top, thus providing for an upward flow of gas through each compartment as said gas passes through said vessel;
   f. liquid spray means positioned at the upper portion of each compartment for spraying scrubbing liquid in a generally downward direction in each said compartment;
   g. liquid collection means disposed at the bottom of each compartment to collect liquid which has been sprayed into each said compartment, each said liquid collection means not being in direct liquid flow communication with any other said liquid collection means;
   h. pumping means for passing scrubbing liquid to the liquid spray means at the furthermost downstream compartment within said vessel;
   i. pumping means for passing scrubbing liquid that collects in said liquid collection means of each said compartment to the spray means for the next preceding upstream compartment; and
   j. means for withdrawing scrubbing liquid from the furthermost upstream compartment within said vessel, whereby all of the gas to be treated flows in countercurrent passage with all of the scrubbing liquid, with vertical countercurrent gas-liquid flow being achieved in each compartment and with generally horizontal countercurrent gas-liquid flow across the length of the contacting vessel, thus enhancing the overall efficiency of the desired gas-liquid contact within the vessel.

2. The apparatus of claim 1 in which the number of said compartments within the vessel is two.

3. The apparatus of claim 1 in which the number of said compartments within the vessel is at least three.

4. The apparatus of claim 1 and including means for the addition of a reactivating agent to the spent scrubbing liquid in the furthermost upstream compartment within the contacting vessel and means for recycling the thus-reactivated liquid removed from said compartment to the furthermost downstream compartment within said vessel.

5. The apparatus of claim 1 in which the number of said compartments is from three to about 10.

6. The apparatus of claim 5 in which the number of compartments is 4.

7. The apparatus of claim 1 and including means for the addition of a reactivating agent to spent scrubbing liquid withdrawn from the vessel, said reactivated scrubbing liquid being returnable to the vessel by said pumping means for passing scrubbing liquid to said liquid spray means at the furthermost downstream compartment within said contacting vessel.

8. The apparatus of claim 7 in which said means for the addition of a reactivating agent comprises a reagent tank with means for passing said spent scrubbing liquid to said reagent tank and means for withdrawing reactivated scrubbing liquid from said reagent tank for recycle to said furthermost downstream compartment within said contacting vessel.

9. The apparatus of claim 1 in which said spray means in each compartment is positioned so that the cone of sprayed liquid emitted therefrom in a generally downward direction will intercept said first baffle means below the passage for the flow of gas from the uppermost portion of each compartment, thus minimizing the back flow of scrubbing liquid through said passage and further enhancing the overall efficiency of countercurrent gas-liquid contact achieved throughout the vessel.

10. The apparatus of claim 9 in which said first baffle means extends upward from the bottom of said vessel to a point near the top thereof, the gap thus formed between the top of said vessel and the upper end of said first baffle means constituting the passage for the flow of gas from the upstream compartment by said first baffle means.

11. The apparatus of claim 10 in which said spray means in each compartment is positioned so that the uppermost portion of the spray of liquid emitted from said spray means strikes said first baffle means below said gap between the top of the vessel and the upper end of said first baffle means.

12. The apparatus of claim 11 in which the number of compartments within said vessel is two.

13. The apparatus of claim 11 in which the number of compartments within said vessel is at least three.

14. The apparatus of claim 11 in which the number of compartments is from 3 to about 10.

15. The apparatus of claim 1 and including a mist eliminator at the downstream end of said vessel and means for passing gas from the furthermost downstream compartment through said mist eliminator to remove entrained liquid from the treated gas withdrawn from the vessel.

16. The apparatus of claim 15 and further including the positioning of mist eliminators at the passage for the flow of gas from the upper-most portion of each compartment, minimizing the entrainment of liquid in the gas being treated and further enhancing the efficiency of the countercurrent gas-liquid contact throughout the vessel.

* * * * *